Sept. 8, 1931.  J. B. ELLINGER  1,822,849
AIRSHIP
Filed Feb. 20, 1929  2 Sheets-Sheet 1

INVENTOR
Julius B. Ellinger
by Harry Bowen
ATTORNEY

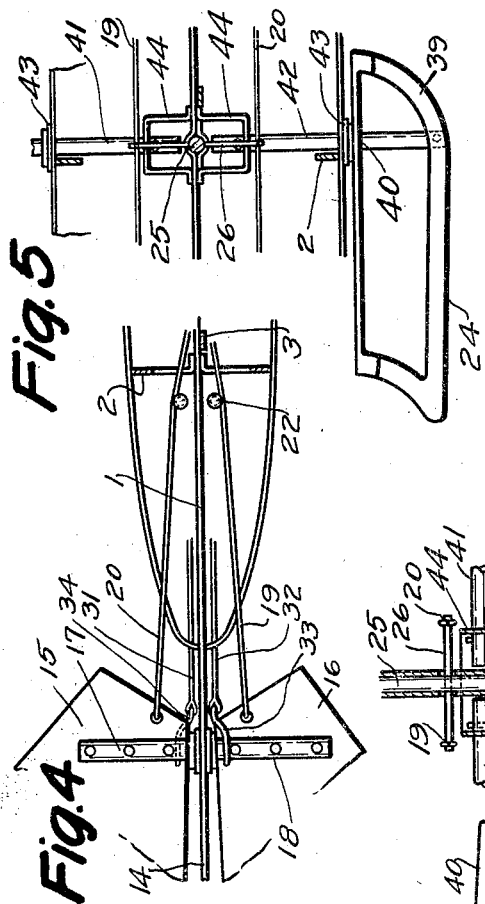

Patented Sept. 8, 1931

1,822,849

UNITED STATES PATENT OFFICE

JULIUS B. ELLINGER, OF SEATTLE, WASHINGTON

AIRSHIP

Application filed February 20, 1929.  Serial No. 341,288.

The invention is an airship of the mono-rigid, lighter-than-air, or Zeppelin type which is constructed about a flexible back bone similar to the back bone of a fish and is so arranged that it may glide around a curve directly into the wind or into an air pocket, and is controlled by a rigid four plane structure mounted as a unit through a ball and socket joint at the front. The invention is an improvement over the device shown in my prior application, Serial Number 288,250, filed July 25, 1928, in that the flexible back bone is provided through the center and the steering connections are simplified.

The object of the invention is to provide an airship of the lighter-than-air type which will bend so that its curvature may be adjusted or automatically adjust itself to air currents so that it may be more readily and efficiently controlled.

Another object of the invention is to provide an airship of the Zeppelin type which is so constructed that it will automatically bend and which is provided with a rigid four plane control device that will turn its nose directly into an air current into which it may suddenly come into contact.

Another object of the invention is to provide a method of constructing a mono-rigid airship of the Zeppelin type so that the entire structure of the ship is constructed about a flexible back bone.

A further object of the invention is to provide suitable wings, planes and elevators and means for mounting the same which will automatically or manually control an airship of the type described.

A further object of the invention is to provide means for connecting the said wings, planes, elevators or rudders to the said airship which will permit them to operate automatically to turn the airship into a sudden air current.

And a still further object of the invention is to provide a flexible airship of the Zeppelin type which is of a comparatively simple and economical construction.

With these ends in view the invention embodies a mono-rigid airship of the Zeppelin type which is constructed with a plurality of transverse frames independently mounted upon a common central laterally flexible member, extending longitudinally of the airship, means for propelling the said airship, suitable wings, rudders and elevators for controlling the direction of the said airship and suitable means for connecting the said wings, rudders, planes and elevators to suitable operating mechanism.

Other features and advantages of the invention will appear from the following description taken in connection with the drawings, wherein:—

Figure 3 is a cross section through the airship showing the transverse construction and a portion of the control mechanism which may extend below the said airship to the cabin.

Figure 4 is a sectional plan showing the connection between the rudders and elevators at the rear and the airship.

Figure 5 is a sectional plan showing the means for connecting and operating the wings.

Figure 6 is a cross section through the central portion of the mechanism shown in Figure 5.

Figure 7 is a sectional plan showing the connections of the direction planes and elevators to the airship at the forward end.

Figure 8 is another detail similar to that shown in Figure 5 showing the mounting of the control mechanism shown in Figure 3.

Figure 1:
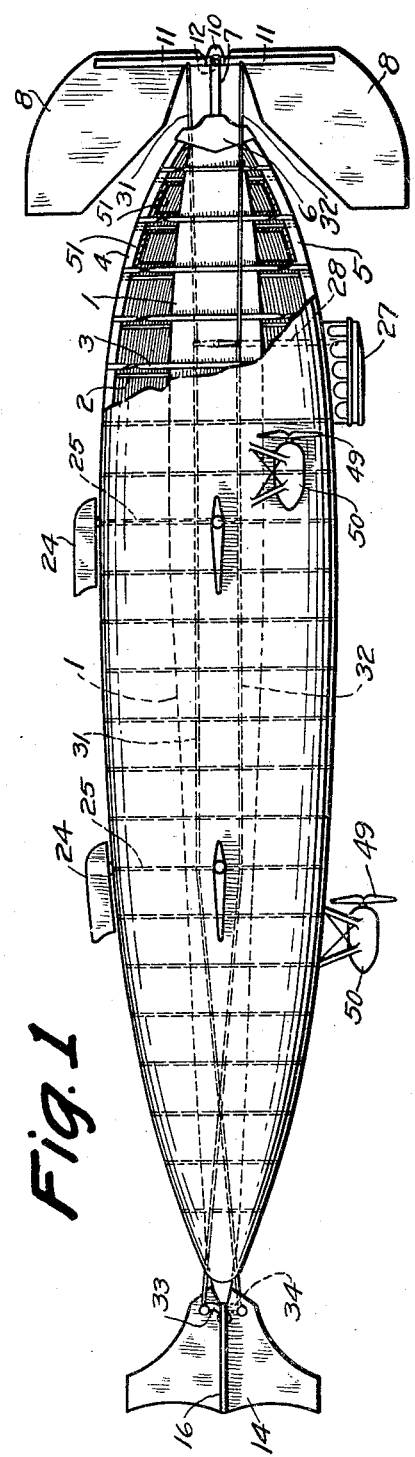
Figure 1 is a side elevation of the airship with parts broken away to show the interior construction.

In the drawings the device is shown as it would be made wherein numeral 1 indicates a laterally flexible member extending longitudinally through the center of the device and transverse ribs, as indicated by the numeral 2, are attached to this member by a vertical strut 3, as shown in Figure 3. The transverse ribs 2 are, in the design shown, made as shown in Figure 3, in two similar sections with the ends of each section flanged and attached to longitudinal ribs, as indicated by the numerals 4 and 5 at the upper and lower edges of the ship. It will be noted that the member 1 is of considerable vertical width so that it will withstand vertical strains through the said device and is of sufficient strength to hold the structure rigid vertically. It will be appreciated, however, that this member may be of any suitable design, may be arranged in any suitable manner and may be located at any suitable point or points so that it will withstand all vertical strains and stresses. The transverse ribs 2 are comparatively light and are attached to the member 1 by comparatively light struts, however, it will be observed that these members are comparatively close together and each supports only a small section of the outer surface of the airship. These transverse members may be of any other type, shape or design and may be wound around the central member similar to a spiral spring and attached at each end or at intermediate points if desired.

At the forward end of the airship the member 1 and the members 4 and 5 are connected to a base 6 from which a shaft 7 extends and at the outer end of the shaft 7 are two vertical planes 8 for controlling the horizontal direction of the airship and two horizontal planes 9 for elevating or lowering the airship. These planes are supported upon a hub 10 through four arms 11 all of which are integral with the hub and therefore rigid in relation to each other. The hub 10 is mounted at the outer end of the rod 7 through a ball and socket joint 12 and a sleeve 13 is provided over the rod 7 which has slots in the end in which the arms 11 of the planes are held to hold the planes permitting the planes 8 to assume an angular position with the longitudinal axis of the airship and the planes 9 to assume an angular position with the horizontal axis.

Figure 2:
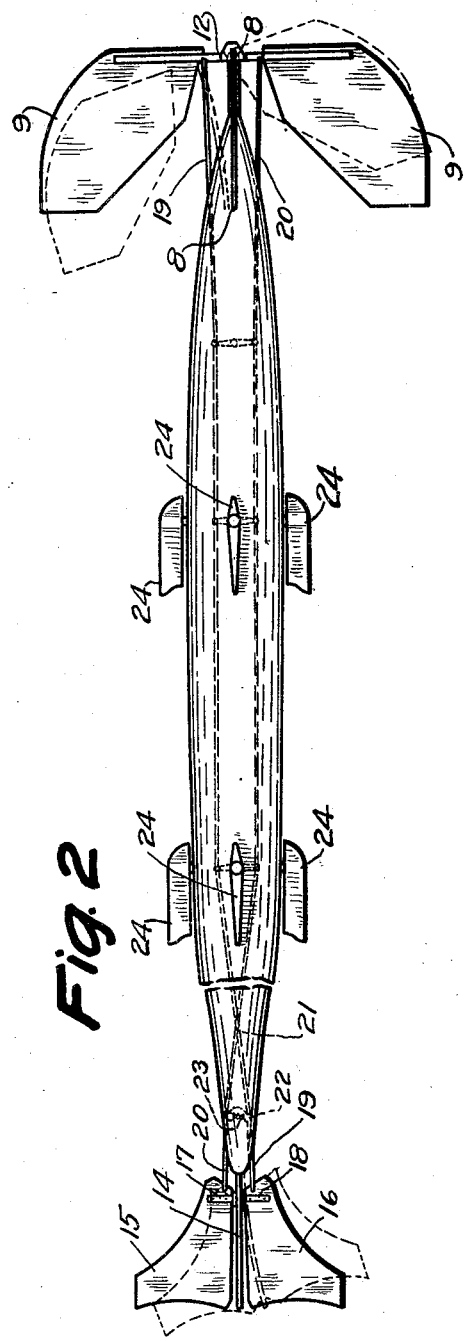
Figure 2 is a plan view having a part broken away.

Control cables are connected to the arms 11 and these extend into the airship and are connected to suitable levers for operating the elevators, rudders and fins at the rear and sides of the airship. The cables operated by the vertical planes 8 which control the horizontal direction of the airship are connected to the arms of the planes 9, and the cables operated by the planes 9 are connected to the arms of the planes 8, as with all of the arms solidly joined to the hub the arms of the opposite planes act as levers for the planes that are operating and the cables are connected to these arms instead of using levers. The rudder at the rear is formed of a vertical plane 14 rigidly connected to the rear and the elevators are formed of horizontal planes 15 and 16 which are pivotally mounted on the vertical plane at the points 17 and 18. It will be noted that control cables 19 and 20 are attached to the arms of the elevators 9 which are operated by the planes 8 at the front and these extend through the airship to elevators at opposite sides of the tail, as shown in Figure 2. These cables cross through the center of the airship at the point 21 and it will be observed that rollers 22, as shown in Figure 4, may be provided to hold the cables outward so that they will hold the rudder with a greater leverage. The cables 19 and 20 may also be held outward by a pivotally mounted arm as indicated by the numeral 23, and shown in Figure 2, if desired. It will be observed that should the nose of the airship engage a strong air current from an angle from either side the current would strike the direction planes 8 and cause these to move toward one side about the ball and socket joint 12 at the end of the member 7 and it will be observed that as the hub assumes an angular position one of the cables 19 or 20 operated by the planes 8 through the arms 11 will draw upon the rudder at the rear and cause it to bend at an angle opposite to that of the members at the nose so that the airship will assume the position of an arc and glide into the current. At the same time the cables 19 and 20 are attached to fins 24 on the top and sides of the airship through vertical members 25 and horizontal bars 26, as shown in Figure 6, so that as the cables 19 and 20 move with the planes 8 they will rotate the vertical members 25 and cause the fins to assume an angular position which will assist in gliding the airship into the air current.

These cables 19 and 20 may also be operated from the cabin, which is indicated by the numeral 27 as shown in Figure 3, through a vertical rod 28 having a handle 29 at its lower end as it will be observed that these cables are attached to a cross member 30 at the upper end of the rod 28. The position of the rudders may therefore be readily controlled from the cabin so that it may be automatically and manually controlled.

Control cables, as indicated by the numerals 31 and 32 for controlling the airship vertically extend through the airship, as shown in Figure 1, and are attached to the elevators 15 and 16 through arms 33 and 34, as shown in Figures 1 and 2. It will be noted that these cables are crossed toward the latter part of the airship so that as the forward planes slant upward the planes at the rear will slant in the opposite direction. These cables 31 and 32 are also attached to levers 34 and 35 on a shaft 36 which may also be operated from the cabin 27 by a lever 37. It will be noted that the shaft 36 is mounted in brackets 38, as shown in Figures 3 and 8.

The fins 24 are made with frames 39 as shown in Figure 5, covered with a suitable covering, and these frames are supported at the point 40. The horizontal fins at the sides of the airship are mounted upon transverse shafts 41 and 42 which are mounted in bearings 43 at the outer edge of the airship and bearings 44 at the center. These shafts are provided with downwardly extending pins 45 and 46, as shown, which engage yokes 47 at the ends of a horizontal bar 48 which is mounted in the vertical shafts 25 similar to the bars 26 and it will be observed that as the shafts 25 are rotated by the cables 19 and 20 through the rods 26 they will turn the rods 48 in a similar manner. The yokes at the ends will move the pins 45 and 46 toward the sides thereby rotating the shafts 41 and 42 in opposite directions, and causing the horizontal fins to assume a slanting position with the fins on one side slanting opposite to those on the other.

It will therefore be observed that the horizontal fins will operate simultaneously with the vertical fins at the top of the airship and thereby facilitate the control thereof, and it will be understood that whereas this is the essential feature of the invention the details of the connections between the rudders, planes and fins may be changed if desired.

The airship may be propelled by suitable propellers, as indicated by the numeral 49, driven by motors 50, as shown. These may be located at any suitable points and as many as may be desired may be used. The motors may be operated from the cabin by any suitable means, and any desired fuel may be used.

The frame, as hereinbefore described may be covered with any suitable material and the interior may be filled with a plurality of individual gas containers, as indicated by the numeral 51, which may be fitted into the sections between the ribs, as shown, or made of any suitable size or design. These sections may be connected so that they may be filled from a common point, or may be omitted so that the entire interior of the airship may be filled.

It will be understood that other changes may be made in the construction without departing from the spirit of the invention. One of which changes may be in the general design or shape of the body of the airship, another may be in the use of transverse ribs of another type or design, or in the use of other means for supporting them from the flexible central member, another may be in the use of rudders of another type or design, or in the location of the said rudders, another may be in the use of other means whereby the said rudders and fins may be operated from the cabin as it will be appreciated that the lever and rod shown are only suggestive, and still another change may be in the use of a greater or lesser number of the said fins, rudders or planes.

The construction will be readily understood from the foregoing description, in use the device may be constructed and arranged as shown and covered with any suitable covering and it will be appreciated that as it is flying through the air and suddenly comes into contact with a strong air current striking its nose from one side the air current will twist the direction planes at the front about the ball and socket joint to the position shown in dotted lines or to the opposite side and the cables or wires connecting the arms of the opposite planes to the rudder at the rear will turn the rudder to the position shown in dotted lines or in the opposite direction and at the same time turn the fins at the top of the airship and also the fins at the sides. This will cause the airship to glide directly into the air current so that it will not be buffeted about as is true of a rigid airship and as the body of the airship is flexible it will follow the path of the planes at the forward end and bend so that it will follow the forward end in a smooth movement It should also be appreciated that the flexible body will greatly facilitate maneuvering around the airport or while passing through a storm or even while traveling under normal conditions. The automatic means for changing the direction of the ship provides a safeguard against unsuspected currents.

It will be appreciated that this device or arrangement may be applied to many other types of aircraft.

Having thus fully described the invention what I claim as new and desire to secure by Letters Patent is:—

1. In an airship of the character described, a flexible longitudinal member, a plurality of transverse ribs independently mounted upon the said longitudinal member, suitable transverse and vertical rudders and elevators at the front and rear of the said airship, means for manually operating the said control devices, said operating means being also adaptable to automatically slope similar devices at the rear opposite to the devices at the front, suitable connections between the said operating devices and the fins at the top and sides whereby the said fins are automatically operated with the said former device, and suitable means for propelling the said airship.

2. In an airship of the character described, a continuous flexible longitudinal member, a plurality of transverse ribs independently attached to the said flexible member, a suitable covering, means for steering the said device, and means for propelling the said device.

3. In an airship of the character described, a continuous flexible member extending through the length of the said airship, means for supporting a covering attached to the said flexible member, suitable elevators and rudders for steering the said airship, and suitable means for propelling the said airship.

4. In an airship of the character described, a continuous flexible member forming a back bone, a plurality of transverse struts attached to the said back bone, suitable elevators and rudders for steering the said device, a covering, and means for propelling the said airship.

5. An airship of the character described, comprising a frame structure having a laterally flexible continuous central longitudinal member, and a plurality of transverse ribs attached to the said central member.

6. An airship of the character described, comprising a frame structure having a continuous laterally flexible central longitudinal member, a plurality of transverse ribs attached to the said central member, and suitable rudders and fins for controlling the said airship.

7. An airship of the character described comprising front and rear end rudders, supporting and control shafts for said rudders, arms fixed to said shafts and extended in lateral directions therefrom, cables connecting opposite arms of the front and rear shafts whereby said rudders will be automatically operated together in opposite directions, and steering fins mounted on the ship having operative connection with the cables whereby they are also automatically operated in accordance with movement of the front rudder.

8. An airship of the character described comprising a frame structure comprising longitudinally extending, laterally flexible keels along its upper and lower sides, a laterally flexible central longitudinal member extending through the length, outwardly bowed ribs connected at their ends to the keels and central member, an envelope enclosing the frame, a rudder shaft at the front of the frame, a rudder supported by the shaft, laterally directed steering arms fixed to the shaft, and cables attached to said arms and extended along the sides of the frame and attached to the rear end thereof whereby action of the rudder in opposite directions effects lateral warping of the frame accordingly.

9. An airship of the character described comprising front and rear end rudders, a supporting and control shaft for each of said rudders, arms fixed to said shafts to extend laterally thereof, steering fins mounted on the top of the ship toward the forward and rearward ends thereof, an operating and supporting shaft for each of said fins, arms fixed to said shafts, and cables joining the latter arms with those of the rudder shafts whereby the rudders and fins operate automatically in unison.

10. In an airship of the character described, a laterally flexible central longitudinal member extending throughout the said airship, a continuous member extending continuously along the upper edge of the said airship, a similar member extending continuously along the lower edge of the said airship, and a plurality of independent transverse ribs attached to the said central and edge members.

11. In an airship of the character described, a laterally flexible central longitudinal member extending throughout the said airship, a continuous member extending continuously along the upper edge of the said airship, a similar member extending continuously along the lower edge of the said airship, a plurality of independent transverse ribs attached to the said central and edge members, front and rear rudders attached to the ends of the said airship, front and rear elevators also attached to the ends of the said airship, a plurality of fins at the sides and top of the said airship, and suitable connections between the said rudders, elevators and fins through which they may be operated.

12. In an airship of the character described, a laterally flexible central longitudinal member extending throughout the said airship, a continuous member extending continuously along the upper edge of the said airship, a similar member extending continuously along the lower edge of the said airship, a plurality of independent transverse ribs attached to the said central and edge members, front and rear rudders attached to the ends of the said airship, front and rear elevators also attached to the ends of the said airship, a plurality of fins at the sides and top of the said airship, suitable connections between the said rudders, elevators and fins whereby the said front and rear rudders, elevators and fins will automatically operate together and in opposite directions, and suitable means whereby the said devices may be manually operated.

13. In an airship of the character described, a laterally flexible central longitudinal member extending throughout the said airship, a continuous member extending continuously along the upper edge of the said airship, a similar member extending continuously along the lower edge of the said airship, a plurality of independent transverse ribs attached to the said central and edge members, front and rear rudders attached to the ends of the said airship, front and rear elevators also attached to the ends of the said airship, a plurality of fins at the sides and top of the said airship, suitable connections between the said rudders, elevators and fins whereby the said front and rear rudders and elevators will automatically operate together and in opposite directions, suitable means whereby the said devices may be manually operated, and means for propelling the said airship.

14. In an airship of the character described, a laterally flexible central longitudinal member, a plurality of transverse ribs attached to the said member, a suitable covering, suitable rudders and elevators attached to the front and rear of the said airship, suitable fins at the sides and top of the said airship, means connecting the said rudders, elevators and fins whereby they may operate simultaneously, and suitable resilient means attaching the said rudders and elevators at the forward end to the said airship which will equalize the positions of the said rudders and elevators.

15. In an airship of the class described, a laterally flexible beam, a covering, means for spacing the covering apart from the said beam, direction planes and elevators at the forward end of the said airship, a common rigid member supporting the said planes and elevators, equalized resilient devices for holding the said planes and elevators, a rudder, rear elevators, means for attaching the rudder and elevators to the rear of the airship, wings on the sides and top of the said airship, and suitable connections between the said planes, elevators, and wings whereby they may be operated automatically or may be operated manually.

In testimony whereof I affix my signature.

JULIUS B. ELLINGER.